United States Patent
Kaneko et al.

(10) Patent No.: US 8,456,800 B2
(45) Date of Patent: Jun. 4, 2013

(54) MULTILAYER CERAMIC ELECTRONIC COMPONENT

(75) Inventors: Toshihiko Kaneko, Tokyo (JP); Ryutaro Yamazaki, Tokyo (JP); Taisuke Masuko, Tokyo (JP); Yusuke Sato, Tokyo (JP); Yasushi Matsuyama, Tokyo (JP); Yasuo Watanabe, Tokyo (JP); Masakazu Hosono, Tokyo (JP); Saori Takeda, Tokyo (JP); Hirobumi Tanaka, Tokyo (JP); Makoto Endo, Tokyo (JP)

(73) Assignee: TDK Corporation, Tokyo (JP)

( * ) Notice: Subject to any disclaimer, the term of this patent is extended or adjusted under 35 U.S.C. 154(b) by 94 days.

(21) Appl. No.: 13/190,033

(22) Filed: Jul. 25, 2011

(65) Prior Publication Data

US 2012/0026642 A1 Feb. 2, 2012

(30) Foreign Application Priority Data

Jul. 28, 2010 (JP) .................. 2010-169552

(51) Int. Cl.
*H01G 4/06* (2006.01)
*H01G 4/005* (2006.01)

(52) U.S. Cl.
USPC ........................................ 361/321.4; 361/303

(58) Field of Classification Search
CPC .................................. H01G 4/30; H01G 4/008
USPC ............................ 361/321.1–321.5, 303, 305
See application file for complete search history.

(56) References Cited

U.S. PATENT DOCUMENTS

| 6,906,906 B2 | 6/2005 | Hattori |
| 2004/0050477 A1 * | 3/2004 | Shindo et al. ............... 156/89.16 |
| 2005/0152095 A1 | 7/2005 | Nakano et al. |

FOREIGN PATENT DOCUMENTS

| JP | A-10-012476 | 1/1998 |
| JP | A-2004-273975 | 9/2004 |
| JP | A-2005-223313 | 8/2005 |
| JP | A-2006-173352 | 6/2006 |
| JP | A-2010-153486 | 7/2010 |

* cited by examiner

*Primary Examiner* — Eric Thomas
(74) *Attorney, Agent, or Firm* — Oliff & Berridge, PLC (57) ABSTRACT

A multilayer ceramic electronic component comprises an element body obtained by stacking dielectric layers (thickness t1) and electrode layers (thickness t2). The dielectric layer includes a compound expressed by $ABO_3$ (A includes Ba, and may include Ca or Sr; and B includes Ti, and may include Zr or Hf), and includes 0.75 to 2.0 moles of MgO, 0.4 to 1.0 mole of an oxide of Y, Dy, Ho and the like in terms of the oxide, and 0.4 to 0.8 mole of $SiO_2$ per 100 moles of the compound. A segregation phase containing Mg is formed in at least a part of an electrode missing portion. Line coverage of the electrode layer is 60 to 90% and relations of 0.3 $\mu m \leq t1 \leq 2.0$ and 0.3 $\mu m \leq t2 < 1.0$ $\mu m$ are fulfilled.

2 Claims, 3 Drawing Sheets

MULTILAYER CERAMIC ELECTRONIC COMPONENT

BACKGROUND OF THE INVENTION

1. Field of the Invention

The present invention relates to a multilayer ceramic electronic component; and a multilayer ceramic electronic component showing favorable dielectric properties even when a dielectric layer is made thinner.

2. Description of the Related Art

A multilayer ceramic capacitor as one example of multilayer ceramic electronic components is widely used as a small-sized, high performance, highly-reliable electronic component, and there are a large number of multilayer ceramic capacitors used in electric and electronic equipments. Recently, with downsizing and increase in performance of equipments, demands for further downsizing, higher performance and higher reliability to the multilayer ceramic electronic component have been increased.

To respond the above demands, for example, a dielectric layer of the multilayer ceramic capacitor has been made thinner and increased in number of layers. However, for making the dielectric layer thinner, when a grain size of a dielectric particle is decreased specific permittivity is declined, so that desired properties may not be obtained.

Japanese Unexamined Patent Publication No H10-12476 discloses a multilayer ceramic capacitor wherein a continuity of an internal electrode is within the range of 70 to 95% when the thickness of a dielectric ceramic layer is made thinner to 20 µm or less. The continuity is defined as a ratio of a region where the internal electrode actually exists to a region to be formed an internal electrode. It discloses that according to the capacitor, it is possible to reduce variation in capacitance and to hardly cause an interfacial crack due to shrinkage distortion between the internal electrode and the ceramic layer at sintering even when the layers are made thinner.

However, there are problems such that the obtained capacitance may be declined because of the existence of a discontinuous portion in the internal electrode, and that high temperature accelerated lifetime may be lowered in the region where the thickness of the ceramic layer is several microns or less. Also, Japanese Unexamined Patent Publication No H10-12476 fails to disclose specific contents of components included in the dielectric ceramic layer.

BRIEF SUMMARY OF THE INVENTION

The present invention has been made in view of the above conditions, and its purpose is to provide a multilayer ceramic electronic component, showing increase in the obtained capacitance due to favorable specific permittivity, low dielectric loss and excellent high temperature accelerated lifetime, even when a dielectric layer is made further thinner.

To attain the above purpose, the multilayer ceramic electronic component according to the present invention is a multilayer ceramic electronic component comprising an element body in which a dielectric layer and an electrode layer are stacked. The dielectric layer has a dielectric ceramic composition including a compound expressed by a formula $ABO_3$ where A is Ba alone, or Ba and at least one selected from Ca and Sr, and B is Ti alone, or Ti and at least one selected from Zr and Hf. The dielectric ceramic composition also includes 0.75 to 2.0 moles of an oxide of Mg in terms of MgO, 0.4 to 1.0 mole of an oxide of R, where R is at least one selected from Y, Dy, Ho, Yb, Lu, Gd and Tb, in terms of $R_2O_3$, and 0.4 to 0.8 mole of an oxide containing Si in terms of $SiO_2$ per 100 moles of the compound. Also, the element body has an electrode missing portion in which the electrode layer is not formed in a region where the electrode layer is supposed to be formed; a segregation phase containing Mg is formed in at least a part of the electrode missing portion; a coverage is 60 to 90%; and relations of $0.3 \leq t1 \leq 2.0$ and $0.3 \leq t2 < 1.0$ are fulfilled when a thickness of the dielectric layer is defined as "t1" and a thickness of the electrode layer is defined as "t2". The coverage is defined as a ratio of a line length of a region where the electrode layer is actually formed with respect to a line length of the region where the electrode layer is supposed to be formed.

Normally in an electronic component after firing, a portion (electrode missing portion) where no electrode layer is formed exists in a region where the electrode layer should have been formed, which is caused by sintering state and the like of an electrically conducting material constituting an electrode layer. This portion substantially lacks the above electrically conducting material, and constitutes a part of the dielectric layer or a void.

In the present invention, the segregation phase containing Mg is formed in the electrode missing portion. Also, although the segregation phase may be formed between the electrode layers (i.e. in the dielectric layer) unless deteriorating properties of the dielectric layer (e.g. specific permittivity, etc.), it is preferred not to be formed between the electrode layers. While Mg suppresses grain growth of dielectric particles, the properties of the dielectric layer may be lowered when Mg is present in the dielectric layer sandwiched between the electrode layers. However, it is possible to suppress grain growth of the dielectric particles without disturbing the properties of the dielectric layer (existing between electrode layers) by controlling a position where the segregation phase containing Mg exists.

Also, in the present invention, in a plane of the element body cut on a plane parallel to a stacking direction, a ratio of a line length based on an assumption that there is no electrode missing portion in the electrode layer (line length where the electrode layer should be formed) is defined as 100%, and a ratio of a line length where the electrode layer is actually formed (line length that the dielectric layer is actually covered by electrode layer) is defined as a coverage. Namely, when the electrode layer has no electrode missing portion, the coverage is 100%.

When the coverage is within the above range, the segregation phase can securely be formed in the electrode missing portion not between the electrode layers, resulting in maximizing the above effect. In particular, by making the thicknesses of the dielectric layer and electrode layer within the above range, the coverage can easily be made within the above range.

Preferably, the dielectric ceramic composition further comprises more than 0 mole to less than 0.5 mole of an oxide of Mn in terms of MnO per 100 moles of the compound.

Such a constitution allows enhancing the effect of the present invention.

In the multilayer ceramic electronic component according to the present invention, the segregation phase containing Mg is formed in the electrode missing portion of the electrode layer. Therefore, even with the presence of such a segregation phase, properties of the dielectric layer (existing between the electrode layers) may not be lowered. Consequently, even when the dielectric layer is made thinner, it is possible to obtain a multilayer ceramic electronic component having high reliability and favorable properties.

DETAILED DESCRIPTION OF THE INVENTION

Hereinafter, the present invention will be explained based on the embodiment shown in the drawings.

(Multilayer Ceramic Capacitor 1)

Figure 1:
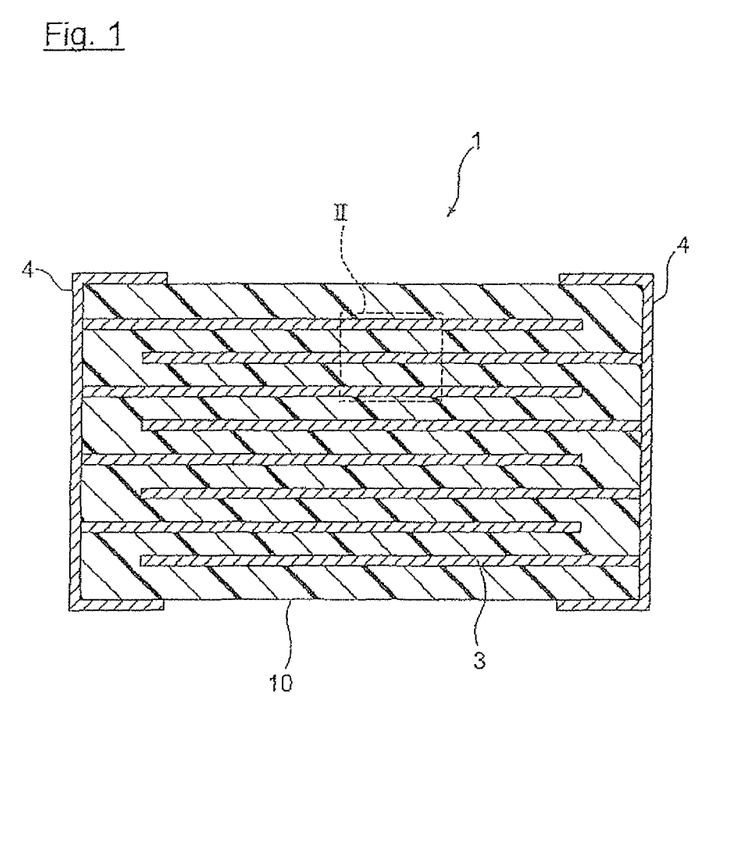
FIG. 1 is a cross-sectional view of a multilayer ceramic capacitor according to one embodiment of the present invention.

As shown in FIG. 1, a multilayer ceramic capacitor 1 according to one embodiment of the present invention comprises a capacitor element body 10 having a structure in which a dielectric layer 2 and an internal electrode layer 3 are alternately stacked. The internal electrode layers 3 are stacked to alternately expose each end face to each surface of opposing end portions of the capacitor element body 10. A pair of external electrodes 4 is formed on both end portions of the capacitor element body 10, and connected to the exposed end faces of the alternately arranged internal electrode layers 3 to form a capacitor circuit.

Shape of the capacitor element body 10 is not particularly limited, and is normally rectangular parallelepiped as shown in FIG. 1. Also, the dimensions are not particularly limited, and are properly determined depending on the use.

(Dielectric Layer 2)

The dielectric layer 2 is composed of a dielectric ceramic composition. The dielectric ceramic composition includes a compound expressed by a formula $ABO_3$ (where A is Ba alone, or Ba and at least one selected from Ca and Sr, B is Ti alone, or Ti and at least one selected from Zr and Hf) as its main component, and includes an oxide of Mg, an oxide of R and an oxide containing Si as its subcomponents.

As an $ABO_3$, barium titanate (preferably those expressed by a composition formula $Ba_m TiO_{2+m}$ where "m" is in a range of $0.995 \leq m \leq 1.010$ and a ratio of Ba and Ti is in a range of $0.9955 \leq Ba/Ti \leq 1.010$) is preferable.

Content of the oxide of Mg is 0.75 to 2.0 moles, preferably 1.25 to 2.0 moles, in terms of MgO, per 100 moles of the $ABO_3$. Too large content of the oxide of Mg may result in solid dispersion into the dielectric particles to cause to deteriorate high temperature accelerated lifetime. In contrast, when the content is too small, grain growth cannot be suppressed which may cause dielectric loss and deterioration in high temperature accelerated lifetime.

Content of the oxide of R is 0.4 to 1.0 mole, preferably 0.8 to 1.0 mole, in terms of $R_2O_3$, per 100 moles of the $ABO_3$. Too large content of the oxide of R may cause not to form the segregation phase containing Mg. On the other hand, when the content is too small, high temperature accelerated lifetime may be deteriorated. R is at least one selected from Y, Gd, Tb, Dy, Ho, Yb and Lu; preferably at least one selected from Y, Dy and Ho, and particularly preferably Y.

The oxide containing Si mainly has a role as a sintering aid. Also, content of the oxide containing Si is 0.4 to 0.8 mole, preferably 0.50 to 0.80 mole, in terms of $SiO_2$, per 100 moles of the $ABO_3$. Too large content of the oxide containing Si may cause excessive sintering, so that grain growth cannot be suppressed to result in deterioration in dielectric loss and high temperature accelerated lifetime. In contrast, too small content may result in insufficient sintering to cause not to form the segregation phase containing Mg. Note that the oxide containing Si may be a composite oxide of Si and other metal element and the like, and $SiO_2$ is preferable in the present embodiment.

The dielectric ceramic composition according to the present embodiment may further include other subcomponents depending on the desired properties.

For example, the dielectric ceramic composition according to the present embodiment preferably includes an oxide of Mn. Content of the oxide of Mn is more than 0 mole to less than 0.5 mole, preferably more than 0 mole to 0.3 mole or less, in terms of MnO, per 100 moles of the $ABO_3$. When the content of the oxide of Mn is too large, specific permittivity is liable to be deteriorated. On the other hand, too small content may cause deterioration in high temperature accelerated lifetime. Also, an oxide of V may be included.

When the thickness of the dielectric layer 2 (interlayer thickness) is defined as t1 [μm], t1 is in the range of $0.30 \leq t1 \leq 2.0$, preferably $0.35 \leq t1 \leq 1.8$ and more preferably $0.4 \leq t1 \leq 1.5$, in the present embodiment in order to meet the needs for forming thinner layers. Too small t1 may cause deteriorated voltage resistance and short circuit resistance. In contrast, too large t1 may cause high coverage to reduce the electrode missing portion, resulting in hardly forming the segregation phase containing Mg in the electrode missing portion, so that specific permittivity is liable to be deteriorated.

The stacked number of the dielectric layers 2 is not particularly limited, and is preferably 20 or more, more preferably 50 or more and particularly preferably 100 or more.

(Internal Electrode Layer 3)

The electrically conducting material included in the internal electrode layer 3 is not particularly limited, and relatively inexpensive base metal can be used because materials constituting the dielectric layer 2 have resistance to reduction. As the base metal used for the electrically conducting material, Ni or Ni alloy is preferable. As the Ni alloy, an alloy of Ni with at least one element selected from Mn, Cr, Co and Al is preferable, and Ni content in the alloy is preferably 95 wt % or more. Note that a variety of trace components such as P may be included in a concentration of about 0.1 wt % or less in the Ni or Ni alloy.

When the thickness of the internal electrode layer 3 (interlayer thickness) is t2 [μm], t2 is in the range of $0.3 \leq t2 < 1.0$, preferably $0.3 \leq t2 \leq 0.8$ and more preferably $0.3 \leq t2 \leq 0.6$, in the present embodiment in order to meet the needs for forming thinner layers. Too small t2 may cause to lower capacitance. In contrast, too large t2 may make it difficult to form the segregation phase containing Mg in the electrode missing portion.

Figure 2:
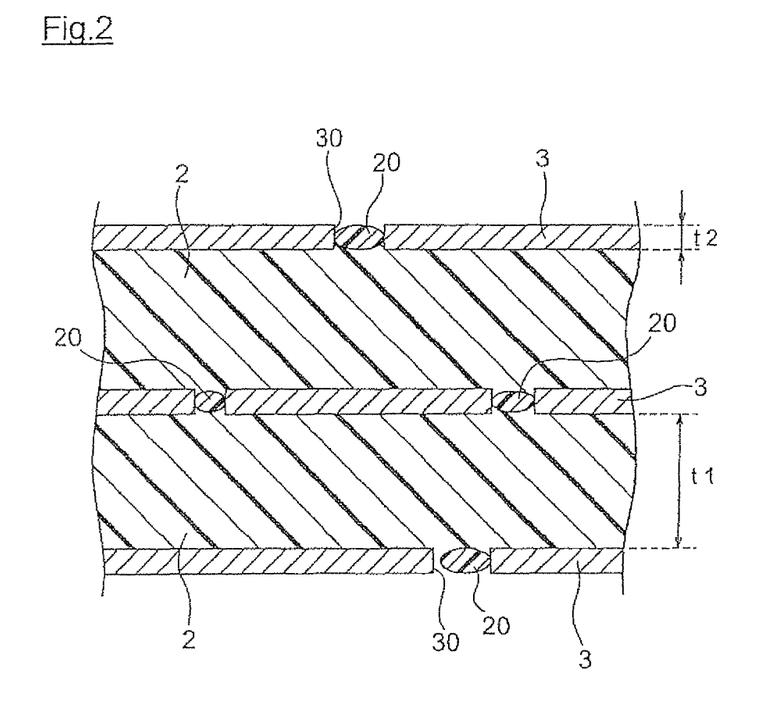
FIG. 2 is an enlarged cross-sectional view of portion II shown in FIG. 1.

When an enlarged view of the internal electrode layer 3 is observed, there is normally a portion where the internal electrode is supposed to be formed but no internal electrode is actually formed (electrode missing portion 30) as shown in FIG. 2. The electrode missing portion 30 is a region where a gap between adjacent electrically conducting material particles becomes wider and electrically conducting materials are not present as a result of balling-up of electrically conducting material particles (mainly Ni particles) due to grain growth when firing.

In the cross-section shown in FIG. 2, the internal electrode layer 3 looks discontinuous because of the electrode missing portion 30, but the electrode missing portions 30 are scattered on the principal surface of the internal electrode layer 3. Therefore, although it is discontinuous in the cross-section shown in FIG. 2, the internal electrode layer 3 is continuous in other cross-sections to secure conduction in the internal electrode layer 3.

In FIG. 2, a total of the line length of the portion where the internal electrode layer 3 is actually formed and the length of the electrode missing portion 30 is equal to the line length of the region where the internal electrode layer 3 is supposed to be formed. In the present embodiment, the ratio of the line length of the region where the internal electrode layer 3 is actually formed with respect to the line length of the region where the internal electrode layer 3 is supposed to be formed is defined as a ratio (coverage) that the internal electrode layer 3 covers the dielectric layer 2. Note that when the coverage is 100%, each internal electrode layer exists as one line.

In the present embodiment, the coverage is 60 to 90%, preferably 75 to 90%. The coverage may vary depending on the thickness of the dielectric layer and the thickness of the electrode layer. Therefore, the thicknesses of the dielectric layer and the electrode layer are set within the above ranges, and furthermore, the ratio of the thickness of the dielectric layer (t1) and the thickness of the internal electrode layer (t2) is set within the above range.

When the coverage is too small, the dielectric layer directly under the uncovered region may not show the properties as a dielectric layer, so that the effective capacity (specific permittivity) of the dielectric layer tends to be lowered. On the other hand, too large coverage may result in reduction of the electrode missing portion and hardly forming the segregation phase containing Mg in the electrode missing portion, so that the properties are liable to be lowered.

(Segregation Phase 20)

The segregation phase 20 is a phase different in composition from the dielectric ceramic composition having $ABO_3$ as a main component and the internal electrode layer 3, and includes at least Mg. The segregation phase 20 may include elemental component other than Mg.

The segregation phase 20 is formed in at least a part of the electrode missing portion 30 in the present embodiment, and is preferably formed in all electrode missing portions 30. Also, in the present embodiment, the segregation phase 20 is not present between the internal electrode layers 3.

Mg suppresses grain growth of the dielectric particles (main component particles) when firing. Therefore, even when the dielectric layer is made thinner, a plurality of dielectric particles can be arranged between the internal electrode layers in the stacking direction, so that high reliability can be maintained.

However, Mg may easily be solid-soluted in the dielectric particles unlike, for example, Si. Solute Mg may cause to lower high temperature accelerated lifetime, which is not preferable. Also, when Mg is included in the grain boundary portion in the dielectric layer, specific permittivity of the grain boundary portion may be lowered, resulting in reduction in specific permittivity of the entire dielectric layer.

Therefore, in the present embodiment, by inclusion of Mg, grain growth of the main component particles is suppressed, and the segregation phase 20 containing Mg is arranged in the electrode missing portion 30 existing on the same surface as the electrode layer 3, not between the electrode layers 3. Due to this constitution, even when the dielectric layer is made thinner, the dielectric properties are not lowered and high reliability can be obtained.

Although it is preferable to form the segregation phase 20 to cover the entire electrode missing portion 30, i.e. to form to be continuous to the internal electrode layer 3, it is not necessary to form to cover completely, and there may be a gap between the internal electrode layer 3 and the segregation phase 20.

(External Electrode 4)

Electrically conducting material included in the external electrode 4 is not particularly limited, and inexpensive Ni, Cu and alloys thereof can be used in the present embodiment. Thickness of the external electrode 4 may properly be determined depending on the use and the like, and is normally preferably 5 to 50 μm or so.

(Method for Manufacturing Multilayer Ceramic Capacitor 1)

The multilayer ceramic capacitor 1 of the present embodiment can be manufactured by producing a green chip by a normal method using a paste such as printing method and sheet method, and firing the same, followed by printing or transferring an external electrode thereon to bake the same, as with conventional multilayer ceramic capacitors. Hereinafter, the method for manufacturing will specifically be explained.

First, dielectric raw material for forming the dielectric layer are prepared, and formed into a paste to prepare a dielectric layer paste.

The dielectric layer paste may either be an organic paste obtained by kneading the dielectric raw material and organic vehicle, or water-based paste.

As the dielectric raw material, raw materials of $ABO_3$, raw materials of the oxide of Mg, raw materials of the oxide of R, and raw materials for the oxide containing Si are first prepared. For these raw materials, oxides of the above mentioned components, mixture thereof and composite oxides can be used. Also, it is possible to properly select from a variety of other compounds to become the above mentioned oxides and composite oxides due to firing such as carbonate, oxalate, nitrate, hydroxide and organometallic compound, and to mix to use.

Note that as the raw materials of $ABO_3$, it is possible to use materials produced by various methods such as a variety of liquid phase methods (e.g. oxalate method, hydrothermal synthesis method, alkoxide method, sol-gel method, etc.) in addition to so-called solid-phase method.

In the present embodiment, as the raw materials of $ABO_3$, raw materials of barium titanate are preferable. Furthermore, BET specific surface area of the raw materials of barium titanate is preferably 6.0 $m^2$/g or more in order to meet the needs of obtaining thinner dielectric layers.

When the dielectric layer is made thinner, for securing sufficient reliability, it is necessary to arrange a plurality of dielectric particles between the electrode layers, and average grain size of the dielectric particles is required to be decreased. Fox this purpose, average particle diameter of the raw materials of the main components may be reduced. The average particle diameter bears an inversely proportional relation to specific surface area, so that the specific surface area is preferably set within the above range.

However, it is known that when raw materials having large specific surface areas are used as the raw materials of barium titanate, the larger specific surface area (smaller average particle diameter) may cause drastic grain growth of the dielectric particles at firing to make the average grain size of the dielectric particles after firing larger. Namely, the larger specific surface area of the raw materials tends to cause an increase in a ratio of the average grain size of the dielectric particles with respect to the average particle diameter of the raw materials.

Figure 3:
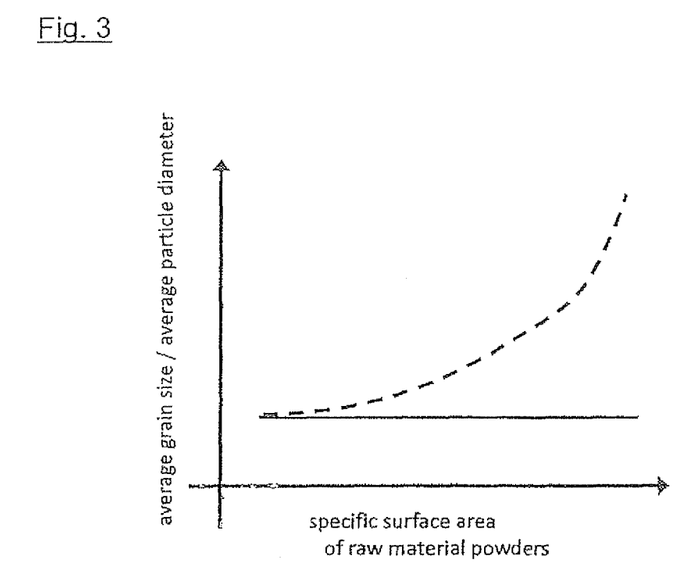
FIG. 3 is a graph schematically showing a relation between a ratio of an average particle diameter of raw materials and an average grain size of the dielectric particles and a specific surface area of the raw materials.

Therefore, by including the oxide of Mg, the grain growth of the dielectric particles is suppressed. Consequently, as shown in FIG. 3, with constant content of the oxide of Mg, as the specific surface area of the raw materials of barium titanate is increased, the ratio of the average particle diameter of the raw materials and the average grain size of the dielectric particles is drastically increased (shown by dotted line in FIG. 3). On the other hand, by increasing the content of the oxide of Mg depending on the specific surface area of the raw materials of barium titanate, it is possible to keep the ratio of the average particle diameter of the raw materials and the average grain size of the dielectric particles constant (shown by solid line in FIG. 3).

Note that the average particle diameter of the raw materials and the average grain size of the dielectric particles can be obtained by measuring diameters for a predetermined number of particles by for example, SEM observation of raw material powder or sintered body and calculating based on the measurement results.

When components other than the above components are included in the dielectric layer, raw materials for the components are prepared. As the raw materials, as described above, it is possible to use oxides of these components, mixture thereof and composite oxides. Also, a variety of other compounds to become the above mentioned oxides and composite oxides after firing can be used.

Contents of respective compounds in the dielectric raw material may be determined to have the above mentioned constitution of the dielectric ceramic composition after firing. Before preparing a paste, the average particle diameter of the dielectric raw material is normally 0.05 to 1 μm or so.

The organic vehicle is obtained by dissolving a binder in an organic solvent. The binder is not particularly limited, and may properly be selected from a variety of normally used binders such as ethyl cellulose and polyvinyl butyral. The organic solvent is not particularly limited, and may properly be selected from a variety of organic solvents such as terpineol, butyl carbitol, acetone and toluene depending on the method such as printing method and sheet method.

Also, when a water-based paste is used as the dielectric layer paste, a water-based vehicle obtained by dissolving a water-soluble binder, dispersant and the like in water, and the dielectric raw material may be kneaded. The water-soluble binder used for the water-based vehicle is not particularly limited, and for example, polyvinyl alcohol, cellulose, water-soluble acrylic resin and the like may be used.

The internal electrode layer paste can be prepared by kneading the electrically conducting materials composed of the above mentioned variety of conducting metals and alloys thereof, or a variety of oxides, organometallic compound, resinate and the like to become the above mentioned electrically conducting materials after firing, with the above mentioned organic vehicle. Also, the internal electrode layer paste May include inhibitor. The inhibitor is not particularly limited, and it is preferable to have the same composition as the main components.

The external electrode paste may be prepared as with the above mentioned internal electrode layer paste.

Content of the organic vehicle in each of the above mentioned pastes is not particularly limited, and may be normal contents, for example, about 1 to 5 wt % for the binder and about 10 to 50 wt % for the solvent. Also, each paste may include an additive selected from a variety of dispersants, plasticizers, dielectrics, insulating materials and the like if needed. The total content thereof is preferably 10 wt % or less.

When the printing method is used, the dielectric layer paste and the internal electrode layer paste are printed on a substrate such as PET, stacked and cut into a predetermined shape, followed by removing the same from the substrate to obtain a green chip.

Also, when the sheet method is used, the dielectric layer paste is used to form a green sheet, and the internal electrode layer paste is printed thereon, followed by stacking the same and cutting into a predetermined shape to obtain a green chip.

Before fixing, the green chip is subjected to binder removal treatment. For conditions for binder removal, temperature rising rate is preferably 5 to 300° C./hour, holding temperature is preferably 180 to 400° C., and temperature holding time is preferably 0.5 to 24 hours. Also, atmosphere at the time of the binder removal treatment is air or reducing atmosphere.

Atmosphere at firing the green chip is preferably reducing atmosphere, and for the atmosphere gas, for example, mixed gas of $N_2$ and $H_2$ can be humidified to use. Oxygen partial pressure at firing may properly be determined depending on types of the electrically conducting materials in the internal electrode layer paste, and when base metal such as Ni, Ni alloy and the like is used as the electrically conducting materials, the oxygen partial pressure is preferably $10^{-11}$ to $10^{-8}$ MPa. Also, temperature rising rate is preferably 600 to 8000° C./hour, more preferably 800 to 8000° C./hour.

In the present embodiment, by setting the oxygen partial pressure and the temperature rising rate at firing within the above ranges, diffusion of Mg at firing can be controlled. Specifically, during the firing, Mg included in the green sheet suppresses the grain growth of the main component particles in the green sheet, and then, Mg is transferred to the electrode missing portion formed during the firing and segregated therein. Thus, the segregation phase containing Mg can be formed in the electrode missing portions in the element body after firing.

Other conditions are preferably as follows. Holding temperature at firing is preferably 1300° C. or less, more preferably 1000 to 1300° C., and its holding time is preferably 0.2 to 8 hours, more preferably 0.2 to 3 hours. When the holding temperature is less than the above range, densification may be insufficient, and when the above range is exceeded, electrode breaking due to abnormal sintering of the internal electrode layer and reduction in dielectric properties due to grain growth may easily be caused. Temperature cooling rate is preferably 50 to 8000° C./hour.

After firing in the reducing atmosphere, the capacitor element body is preferably subjected to annealing. The annealing is a treatment for reoxidation of the dielectric layer, by which high temperature accelerated lifetime can be made remarkably longer.

Oxygen partial pressure in annealing atmosphere is preferably $10^{-9}$ to $10^{-5}$ MPa. When the oxygen partial pressure is less than the above range, the reoxidation of the dielectric layer is difficult, and when the above range is exceeded, oxidation of the internal electrode layer tends to proceed.

Holding temperature at the annealing is preferably 1100° C. or less, particularly preferably 900 to 1100° C. When the holding temperature is less than the above range, oxidation of the dielectric layer is insufficient to easily cause lowered insulation resistance (IR) and shortened high temperature accelerated lifetime. On the other hand, when the holding temperature exceeds the above range, the internal electrode layer is oxidized to lower capacity. Note that the annealing may only include temperature rising process and temperature cooling process. Namely, the temperature holding time may be zero. In this case, the holding temperature also means the maximum temperature.

For other annealing conditions, temperature holding time is preferably 0 to 30 hours, more preferably 1 to 25 hours, and temperature cooling rate is preferably 50 to 500° C./hours, more preferably 100 to 300° C./hours. Also, as atmosphere gas for annealing, for example, it is preferable to use humidified $N_2$ gas and the like.

In the above mentioned binder removal treatment, firing and annealing, for example, in order to humidify $N_2$ gas, mixed gas and the like, a wetter and the like may be used. In this case, water temperature is preferably about 5 to 75° C.

The binder removal treatment, firing and annealing may be performed either continuously or independently.

Thus-obtained capacitor element body is subjected to end surface polishing such as barrel polishing and sandblast, and the external electrode paste is coated thereon and fired to form the external electrode 4. Then, if necessary, a covering layer is formed on a surface of the external electrode 4 by plating and the like.

Thus-produced multilayer ceramic capacitor of the present embodiment is mounted on a printed substrate and the like by soldering and the like, and used for a variety of electronic devices, etc.

Hereinbefore, an embodiment of the present invention has been explained, but the present invention is not limited to the above mentioned embodiment and can be variously modified within the gist of the present invention.

In the above mentioned embodiment, as a multilayer ceramic electronic component according to the present invention, a multilayer ceramic capacitor is exemplified, but the multilayer ceramic electronic component according to the present invention is not limited to a multilayer ceramic capacitor, and may be any electronic component having the above features.

EXAMPLES

Hereinafter, the present invention will be explained based on further detailed examples, but the present invention is not limited to the examples.

Example 1

Firstly, $BaTiO_3$ powder having BET specific surface area of 8.0 $m^2/g$ as a raw material of the main component, and $MgCO_3$, $Y_2O_3$ and $SiO_2$ as raw materials of the subcomponents were respectively prepared.

Secondly, the above prepared $BaTiO_3$ powder and raw materials of the subcomponents were wet pulverized by a ball mill for 15 hours, and dried to obtain the dielectric raw material. Note that an additive amount of each subcomponent was set such that the contents of the subcomponents in the dielectric layer after firing per 100 moles of $BaTiO_3$ as the main component were equal to the amounts shown in Table 1. Also, $MgCO_3$ was included as MgO in the dielectric ceramic composition after firing.

Then, 100 parts by weight of the obtained dielectric raw material, 10 parts by weight of polyvinyl butyral resin, 5 parts by weight of dioctyl phthalate (DOP) as a plasticizer, and 100 parts by weight of alcohol as a solvent were mixed by a ball mill to form a paste, so that the dielectric layer paste was obtained.

Also, 44.6 parts by weight of Ni powder, 52 parts by weight of terpineol, 3 parts by weight of ethylcellulose, and 0.4 part by weight of benzotriazole were kneaded by triple-roll to form a slurry, so that the internal electrode layer paste was prepared.

Then, by using the above-prepared dielectric layer paste, a green sheet was formed on a PET film. Next, by using the internal electrode layer paste, the electrode layer was printed on the green sheet with a predetermined pattern, followed by removal of the sheet from the PET film, so that the green sheet having the electrode layer was prepared. Then, a plurality of the green sheets having the electrode layer was stacked, and adhered by pressure to obtain a green multilayer body, and this green multilayer body was cut into a predetermined size to obtain a green chip.

Next, the obtained green chip was subjected to binder removal treatment, firing and annealing under the following conditions to obtain an element body as a sintered body.

The binder removal conditions were the temperature rising rate: 25° C./hour, the holding temperature: 260° C., the temperature holding time: 8 hours and the atmosphere: in air.

The firing conditions were the temperature rising rate: 800° C./hour, the holding temperature: 1100 to 1150° C. and the holding time: 1 hour. The temperature cooling rate was the same as the temperature rising rate. Note that the atmosphere gas was humidified mixed gas of $N_2+H_2$, and the oxygen partial pressure was maintained at $10^{-10}$ MPa.

The annealing conditions were the temperature rising rate: 200° C./hour, the holding temperature: 1000° C., the temperature holding time: 2 hours, the temperature cooling rate: 200° C./hour, and the atmosphere gas: humidified $N_2$ gas (oxygen partial pressure: $10^{-7}$ MPa).

Note that the atmosphere gases at the firing and annealing were humidified by a wetter.

Then, end faces of the obtained element body was polished by sandblast, followed by coating Cu as the external electrode, so that a sample of the multilayer ceramic capacitor shown in FIG. 1 was obtained. Size of the obtained capacitor sample was 3.2 mm×1.6 mm×0.6 mm, and the thickness of the dielectric layer (t1) and the thickness of the internal electrode layer (t2) were values shown in Table 1 respectively. Also, the number of the dielectric layers sandwiched by the internal electrode layers was 10.

For the obtained capacitor sample, observation of the segregation phase, and measurements of coverage, specific permittivity, dielectric loss (tan δ) and high temperature accelerated lifetime were respectively conducted by the following methods.

(Observation of Segregation Phase)

First, the capacitor sample was cut on a plane perpendicular to the dielectric layers. Then, the cut plane was subjected to SEM observation and STEM-EDX analysis, and from the result of elemental mapping for Mg element, it was confirmed whether the segregation phase containing Mg was present or not. The results are shown in Table 1.

(Coverage)

The capacitor sample was subjected to SEM observation on the above cut plane, and the coverage was calculated from the obtained SEM picture. Specifically, on the assumption of absence of the electrode missing portion of the internal electrode layer, the ratio of the line length where the electrode layer was actually formed with respect to the line length where the electrode layer was supposed to be formed was calculated to define it as coverage. In the present example, 60 to 90% was evaluated as being favorable. The results are shown in Table 1.

(Specific Permittivity $\in$)

The specific permittivity $\in$ (no unit) was calculated based on the capacitance of the capacitor sample measured at reference temperature of 25° C. with a digital LCR meter (4274A manufactured by YHP) under conditions of frequency at 1 kHz and level of input signal (measured voltage) at 1.0 Vrms. Higher specific permittivity is more preferable, and in the present example, 2800 or more was evaluated as being favorable. The results are shown in Table 1.

(Dielectric Loss (tan δ))

For the capacitor sample, the dielectric loss (tan δ) was measured at reference temperature of 25° C. with the digital LCR meter (4274A manufactured by YHP) under conditions of frequency at 1 kHz and level of input signal (measured voltage) at 0.5 Vrms. Lower dielectric loss is more preferable, and in the present example, 5.0% or less was evaluated as being favorable. The results are shown in Table 1.

(High Temperature Accelerated Lifetime (HALT))

The capacitor sample was maintained in the state of applying direct voltage at 200° C. under electric field of 6 V/μm to measure time-dependent change of insulation resistance (IR), by which the high temperature accelerated lifetime was evaluated. In the present example, the time from the start of applying voltage until the insulation resistance became $10^6 \Omega$ or less was determined as breakdown time, and mean time to failure (MTTF) calculated by Weibull analysis of the breakdown time was defined as lifetime. In the present example, 20 capacitor samples were evaluated, and the average value was determined as high temperature accelerated lifetime. In the present example, high temperature accelerated lifetime of 30 hours or more was evaluated as being favorable. The results are shown in Table 1.

age was too low, resulting in lowering effective capacity, so that the specific permittivity shown by the dielectric layer was reduced.

It was confirmed that when the content of the oxide of Mg was too small (sample No. 10), the grain growth of the dielectric particles could not be suppressed to cause excessive sintering, which resulted in drastically deteriorating dielectric loss and high temperature accelerated lifetime.

On the other hand, it was confirmed that when the content of the oxide of Mg was too large (sample No. 14), solid-soluted Mg to the dielectric particles occurred to cause deterioration of specific permittivity and high temperature accelerated lifetime.

It was confirmed that when the content of the oxide of R was too large (sample No. 23), no segregation phase was formed in the electrode missing portion, so that the specific permittivity was deteriorated.

From Table 1, it was confirmed that when the content of the oxide containing Si was too small (sample No. 17), specific permittivity and high temperature accelerated lifetime were deteriorated because of insufficient sintering.

TABLE 1

| | multilayer ceramic capacitor | | | | | | | | segregation | | properties | | |
|---|---|---|---|---|---|---|---|---|---|---|---|---|---|
| | thickness of dielectric layer | thickness of electrode layer | | components of dielectric layer | | | | | phase containing Mg | Mg | | | |
| | | | | | | rare earth | | | in electrode | between | | | |
| sample No | t1 [μm] | t2 [μm] | coverage [%] | MgO [mol] | content [mol] | kind | $SiO_2$ [mol] | MnO [mol] | missing portion | electrode layers | specific permittivity ε | tanδ [%] | HALT [h] |
| 1 | 0.5 | 0.5 | 73 | 1.50 | 0.80 | Y | 0.60 | 0.15 | found | none | 3360 | 3.1 | 55 |
| 2 | 1.0 | 0.5 | 82 | 1.50 | 0.80 | Y | 0.60 | 0.15 | found | none | 3280 | 3.1 | >100 |
| 3 | 2.0 | 0.5 | 88 | 1.50 | 0.80 | Y | 0.60 | 0.15 | found | none | 2990 | 2.9 | >100 |
| 4 | 3.0 | 0.5 | 94 | 1.50 | 0.80 | Y | 0.60 | 0.15 | found | found | 2750 | 2.7 | >100 |
| 5 | 0.5 | 0.2 | 53 | 1.50 | 0.80 | Y | 0.60 | 0.15 | found | none | 2520 | 3.2 | 40 |
| 6 | 0.6 | 0.3 | 62 | 1.50 | 0.80 | Y | 0.60 | 0.15 | found | none | 2810 | 3.1 | 51 |
| 7 | 0.6 | 0.6 | 71 | 1.50 | 0.80 | Y | 0.60 | 0.15 | found | none | 3030 | 3.1 | 50 |
| 8 | 0.3 | 0.35 | 88 | 1.50 | 0.80 | Y | 0.60 | 0.15 | found | none | 2930 | 2.9 | 38 |
| 9 | 0.6 | 1.3 | 92 | 1.50 | 0.80 | Y | 0.60 | 0.15 | found | found | 2730 | 2.7 | 46 |
| 10 | 0.5 | 0.5 | 65 | 0.50 | 0.80 | Y | 0.60 | 0.15 | none | none | 5600 | 12.5 | 5 |
| 11 | 0.5 | 0.5 | 73 | 0.75 | 0.80 | Y | 0.60 | 0.15 | found | none | 3430 | 3.1 | 58 |
| 12 | 0.5 | 0.5 | 74 | 1.00 | 0.80 | Y | 0.60 | 0.15 | found | none | 3220 | 3.0 | 51 |
| 12a | 0.5 | 0.5 | 75 | 1.25 | 0.80 | Y | 0.60 | 0.15 | found | none | 3380 | 3.1 | 50 |
| 13 | 0.5 | 0.5 | 72 | 2.00 | 0.80 | Y | 0.60 | 0.15 | found | none | 3510 | 3.2 | 36 |
| 14 | 0.5 | 0.5 | 74 | 2.50 | 0.80 | Y | 0.60 | 0.15 | found | none | 2730 | 3.2 | 22 |
| 15 | 0.5 | 0.5 | 73 | 1.50 | 0.80 | Dy | 0.60 | 0.15 | found | none | 3550 | 3.3 | 44 |
| 16 | 0.5 | 0.5 | 72 | 1.50 | 0.80 | Ho | 0.60 | 0.15 | found | none | 3110 | 3.0 | 40 |
| 17 | 0.5 | 0.5 | 74 | 1.50 | 0.80 | Y | 0.20 | 0.15 | none | none | 2100 | 2.1 | 16 |
| 18 | 0.5 | 0.5 | 73 | 1.50 | 0.80 | Y | 0.40 | 0.15 | found | none | 2950 | 2.9 | 43 |
| 18a | 0.5 | 0.5 | 75 | 1.50 | 0.80 | Y | 0.50 | 0.15 | found | none | 3150 | 3.0 | 46 |
| 19 | 0.5 | 0.5 | 73 | 1.50 | 0.80 | Y | 0.80 | 0.15 | found | none | 3200 | 3.1 | 47 |
| 20 | 0.5 | 0.5 | 74 | 1.50 | 0.80 | Y | 1.00 | 0.15 | none | none | 5800 | 22.4 | 8 |
| 21 | 0.5 | 0.5 | 74 | 1.50 | 0.40 | Y | 0.60 | 0.15 | found | none | 3530 | 3.4 | 34 |
| 21a | 0.5 | 0.5 | 74 | 1.50 | 0.80 | Y | 0.60 | 0.15 | found | none | 3290 | 3.1 | 52 |
| 22 | 0.5 | 0.5 | 75 | 1.50 | 1.00 | Y | 0.60 | 0.15 | found | none | 2960 | 2.9 | 57 |
| 23 | 0.5 | 0.5 | 73 | 1.50 | 1.30 | Y | 0.60 | 0.15 | none | none | 2300 | 2.3 | 30 |

From Table 1, it was confirmed that when the thickness of the dielectric layer (t1) and the thickness of the electrode layer (t2) were too large (samples No 4 and 9), the specific permittivity was reduced. This might be because too high coverage caused to reduce deposition of the segregation phase containing Mg in the electrode missing portion. Also, this might be affected by more segregation phases containing Mg generated between the electrode layers.

Also, it was confirmed that when the thickness of the electrode layer (t2) was too small (sample No. 5), the cover- On the other hand, it was confirmed that when the content of the oxide containing Si (sample No. 20), specific permittivity and high temperature accelerated lifetime were deteriorated due to abnormal grain growth caused by excessive sintering. Also, it was confirmed that the segregation phase containing Si was formed instead of the segregation phase containing Mg. This might be because sintering was completed before Mg moved to the electrode missing portion since sintering was fast and that the segregation phase containing Mg was not formed.

Example 2

Except for the content of the oxide of Mn to the value in Table 2, the multilayer ceramic capacitor sample was prepared as with sample No. 1, and property evaluation was done as in Example 1. The results are shown in Table 2.

TABLE 2

| sample No | MnO [mol] | segregation phase containing Mn | specific permittivity $\epsilon$ |
|---|---|---|---|
| 31 | 0.05 | none | 3450 |
| 1 | 0.15 | none | 3360 |
| 32 | 0.3 | none | 3150 |
| 33 | 0.5 | none | 2680 |
| 34 | 0.8 | found | 2450 |
| 35 | 1.0 | found | 2200 |

From Table 2, it was confirmed that when the content of the oxide of Mn was within the preferable range of the present invention, no segregation phase containing Mn was formed, and favorable specific permittivity was obtained. On the other hand, it was confirmed that when the content of the oxide of Mn was out of the preferable range of the present invention, the specific permittivity was reduced and that the segregation phase containing Mn tended to be formed.

The invention claimed is:

1. A multilayer ceramic electronic component comprising an element body in which a dielectric layer and an electrode layer are stacked, wherein:

said dielectric layer has a dielectric ceramic composition including a compound expressed by a formula $ABO_3$, where A is Ba alone, or Ba and at least one selected from Ca and Sr, and B is Ti alone, or Ti and at least one selected from Zr and Hf, and including 0.75 to 2.0 moles of an oxide of Mg in terms of MgO, 0.4 to 1.0 mole of an oxide of R, where R is at least one selected from the group consisting of Y, Dy, Ho, Yb, Lu, Gd and Tb, in terms of $R_2O_3$, and 0.4 to 0.8 mole of an oxide containing Si in terms of $SiO_2$, per 100 moles of said compound;

said element body has an electrode missing portion in which the electrode layer is not formed in a region where the electrode layer is supposed to be formed;

a segregation phase containing Mg is formed in at least a part of said electrode missing portion;

a coverage, defined as a ratio of a line length of a region where the electrode layer is actually formed with respect to a line length of the region where the electrode layer is supposed to be formed, is 60 to 90%; and relations of $0.3\ \mu m \leq t1 < 2.0\ \mu m$ and $0.3\ \mu m \leq t2 < 1.0\ \mu m$ are fulfilled when a thickness of said dielectric layer is defined as "t1" and a thickness of said electrode layer is defined as "t2".

2. The multilayer ceramic electronic component as set forth in claim 1, wherein said dielectric ceramic composition further includes more than 0 mole to less than 0.5 mole of an oxide of Mn in terms of MnO per 100 moles of said compound.

* * * * *